United States Patent [19]

Matsui

[11] Patent Number: 4,977,112
[45] Date of Patent: Dec. 11, 1990

[54] SILICON NITRIDE SINTERED BODY AND A METHOD OF PRODUCING THE SAME

[75] Inventor: Minoru Matsui, Nagoya, Japan

[73] Assignee: NGK Insulators, Ltd., Japan

[21] Appl. No.: 394,305

[22] Filed: Aug. 16, 1989

Related U.S. Application Data

[63] Continuation of Ser. No. 158,044, Feb. 16, 1988, abandoned, which is a continuation of Ser. No. 863,733, May 16, 1986, abandoned.

[30] Foreign Application Priority Data

May 20, 1985 [JP] Japan .................... 60-107249

[51] Int. Cl.$^5$ .............................................. C04B 35/58
[52] U.S. Cl. ........................................ 501/97; 501/98; 264/65; 264/66
[58] Field of Search ............... 501/96, 97, 98; 264/65, 264/66

[56] References Cited

U.S. PATENT DOCUMENTS

| 4,179,301 | 12/1979 | Buljan | 501/97 |
| 4,264,550 | 4/1981 | Ezis | 264/85 |
| 4,280,850 | 7/1981 | Smith et al. | 801/97 |
| 4,332,909 | 6/1982 | Nishida et al. | 501/98 X |
| 4,388,085 | 6/1983 | Savin et al. | 501/98 X |
| 4,407,970 | 10/1983 | Komatsu et al. | 501/98 X |
| 4,511,402 | 4/1985 | Mura et al. | 501/98 X |
| 4,699,890 | 10/1987 | Matsui | 501/98 |

FOREIGN PATENT DOCUMENTS

| 0107919 | 9/1983 | European Pat. Off. |
| 0174153 | 8/1985 | European Pat. Off. |
| 0166412 | 3/1986 | European Pat. Off. |
| 49-63710 | 6/1974 | Japan . |
| 57-200266 | 12/1982 | Japan | 501/97 |
| 58-60676 | 4/1983 | Japan | 501/97 |
| 58-64268 | 4/1983 | Japan . |
| 2129788 | 5/1984 | United Kingdom | 501/97 |
| 2155007 | 9/1985 | United Kingdom | 501/97 |
| 8000079 | 1/1980 | World Int. Prop. O. |

Primary Examiner—Mark L. Bell
Assistant Examiner—David M. Brunsman
Attorney, Agent, or Firm—Arnold, White & Durkee

[57] ABSTRACT

A high density silicon nitride sintered body having a substantially crystallized intergranular phase and an improved mechanical strength at high temperature is produced by firing a molded body of a blend comprising $Si_3N_4$, a sintering aid and a crystallization controlling agent selected from at least one compound of Cr, Mn, Co, Ni, Nb and Mo with a specified blending ratio.

12 Claims, 2 Drawing Sheets

FIG._2
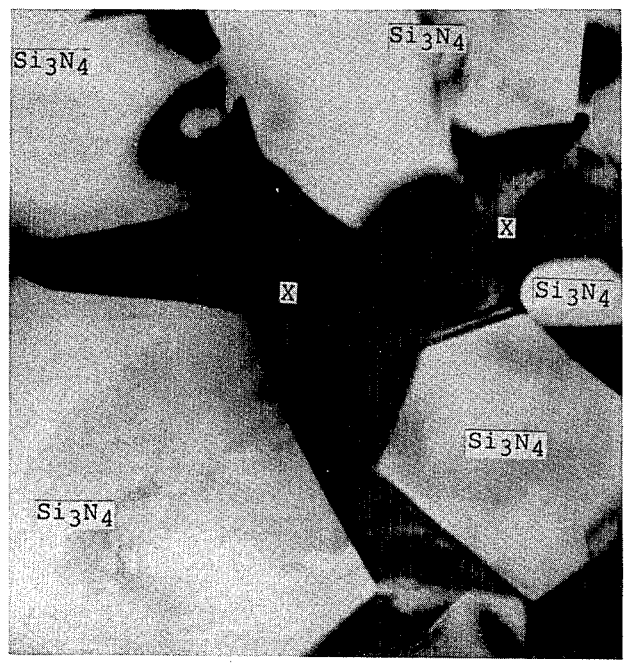
FIG._3
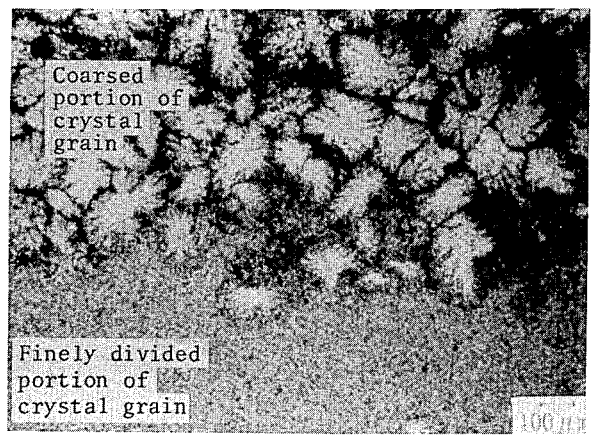

SILICON NITRIDE SINTERED BODY AND A METHOD OF PRODUCING THE SAME

This is a continuation of application Ser. No. 07/158,044 filed Feb. 16, 1988, now abandoned, which in turn is a continuation of application Ser. No. 06/863,733 filed May 16, 1986, now abandoned.

BACKGROUND OF THE INVENTION

1. Field of the Invention

This invention relates to a high density silicon nitride sintered body having improved mechanical strength and a substantially crystallized intergranular phase and a method of producing the same, and more particularly to a high density silicon nitride body containing predetermined amounts of a sintering aid and at least one substance selected from $Cr_2O_3$, MnO, CoO, NiO, $Nb_2O_5$ and $MoO_3$, and being capable of shaping into large-size products or mass-firing.

2. Related Art Statement

Silicon nitride sintered bodies are superior to metallic materials in mechanical stregth at high temperature, heat resistance, thermal shock resistance, corrosion resistance and the like, so that they are considered to be used for high temperature structural components, which can not be adapted in the metallic material, and the development of their applications is performed extensively.

Since silicon nitride can not easily be subjected to solid-phase sintering owing to the covalent bonding substance, it is subjected to liquid-phase sintering wherein additives such as MgO, SrO, $Ce_2O_3$, $Y_2O_3$, $ZrO_2$, rare earth oxides, $Al_2O_3$, AlN and the like are added to silicon nitride and a glassy phase is formed at a firing temperature to effect densification. Thus, the resulting sintered body contains a large amount of glassy phase produced during the firing at its grain boundary. Therefore, when such bodies are used in high temperature environments, the glassy phase in the grain boundaries is softened to degrade fatigue properties and oxidation resistance resulting from mechanical strength, creep deformation and creep rupture.

Consequently, many studies have been made with respect to a method for crystallizing the intergranular phase without the formation of a glassy phase. In Japanese Patent laid open No. 55-3,397, there is disclosed a method wherein silicon nitride is added with $Y_2O_3$ and $SiO_2$ and then fired to obtain a silicon nitride sintered body containing crystalline phases of $Y_2O_3.2SiO_2$ and $10Y_2O_3 \cdot 9SiO_2 \cdot Si_3N_4$ in its grain boundary. In Japanese Patent laid open No. 56-59,674, there is disclosed a method wherein silicon nitride is added with $Y_2O_3$ and then fired to obtain a silicon nitride sintered body containing a crystalline phase of $xY_2O_3 \cdot ySi_3N_4$ in its grain boundary. Further, in Japanese Patent laid open No. 59-8,670, a silicon nitride sintered body having an intergranular phase of melilite mineral facies represented by (Si,Mg,Y) (O,N) is also shown. Furthermore, in Japanese Patent Application Publication No. 58-50,994, there is disclosed a method wherein a silicon nitride sintered body containing $Y_2O_3$ or $CeO_2$ is reheated to form a crystal of $Y_2O_3 \cdot Si_3N_4$ or $Ce_2O_3 \cdot Si_3N_4$ in the intergranular phase. These silicon nitride sintered bodies having crystallized intergranular phases all exhibit an improved high-temperature strength. In Japanese Patent Application No. 59-186,287, there is proposed a silicon nitride sintered body containing predetermined amounts of $Y_2O_3$, MgO and $CeO_2$, and having a crystallized intergranular phase obtained by sufficient densification through pressureless sintering and excellent high-temperature strength, oxidation resistance and static fatigue properties.

In these silicon nitride sintered bodies having the crystallized intergranular phase, the glassy phase in a grain boundary is crystallized at the cooling stage after densification through pressureless sintering or hot-press sintering. Japanese Patent laid open Nos. 59-207,879 and 59-213,676 disclose that when the silicon nitride sintered body containing rare earth elements and Group IIa elements as a sintering aid are sintered in a complicated or large size configuration, a secondary phase is ununiformly distributed and segregated in the intergranular phase to largely scatter the properties of the sintered body and reduce the strength, while the addition of a nitride or an oxynitride as a sintering aid enables the sintering in the complicated or large size configuration. Furthermore, in silicon nitride sintered bodies containing predetermined amounts of $Y_2O_3$, MgO and $CeO_2$, as shown in Japanese Patent Application No. 59-186,287, if the cooling rate is fast, the intergranular phase is not sufficiently crystallized, while if the cooling rate is slow, crystal grains in the intergranular phase largely grow to form coarse crystal grains in the intergranular phases. If the crystallization of intergranular phase is insufficient, the intergranular phase must be crystallized by a reheating treatment for improving high-temperature strength, oxidation resitance and static fatigue properties. On the other hand, if the crystal grains in the intergranular phase become coarser, cracks are produced at an interface between crystal grains in the intergranular phase to considerably reduce the strength. When the sintering aid is a nitride or an oxynitride, the composition of O, N in the intergranular phase varies and also the precipitated crystalline phase varies and consequently the properties degrade. Therefore, it is necessary to restrict the cooling rate in order to obtain the sintered body having a substantially crystallized intergranular phase composed of fine crystal grains.

In a silicon nitride sintered body having substantially crystallized intergranular phases as described above, if it is not intended to control the cooling stage after the firing, there results an unbalance between a crystal nucleus formation step and a crystal growth step constituting the crystallization stage and the crystallized intergranular phase is not favorably obtained. Therefore, it is necessary to limit the cooling rate. However, in mass-firing or firing into large size products, the sufficiently fast cooling rate is not obtained owing to heat capacity of the furnace or the product itself, and the crystal grains in the intergranular phase are coarsened to produce cracks in the interface between crystal grains, resulting in a remarkable reduction of the strength.

SUMMARY OF THE INVENTION

It is an object of have a invention to solve the aforementioned drawbacks and to provide high density silicon nitride sintered bodies, which have a substantially crystallized intergranular phase, have a high-temperature strength and good oxidation resistance and excellent in the fatigue properties without causing creep deformation or subcritical crack growth, and enable the mass firing or the shaping of large-size products by crystallizing the intergranular phase into fine crystal grains even at a slow cooling rate after densification due to firing, and a method of producing the same. More particularly, the invention is to provide silicon nitride sintered bodies having a substantially crystallized intergranular phase, which give uniform products having a crystalline intergranular phase composed of fine crystal grains up to their inside at a slow cooling rate even in a thick product obtained by densification after firing.

According to the invention, there is the provision of a silicon nitride sintered body consisting mainly of $Si_3N_4$ and a sintering aid and containing at least one compound of Cr, Mn, Co, Ni, Nb and Mo as a crystallization controlling agent for the intergranular phase, and having a substantially crystallized intergranular phase. Further, the invention provides a method of producing silicon nitride sintered bodies, which comprises molding and firing a blended powder of $Si_3N_4$ with a sintering aid and at least one compound of Cr, Mn, Co, Ni, Nb and Mo as a crystallization controlling agent.

BRIEF DESCRIPTION OF THE DRAWINGS

The invention will be described with reference to the accompanying drawings, wherein:

FIG. 2 is an electron photomicrograph showing a grain structure of silicon nitride sintered body No. 14 according to the invention; and FIG. 3 is an electron photomicrograph showing a grain structure of silicon nitride sintered body No. 29 which is outside of the compositional range defined by the invention.

DETAILED DESCRIPTION OF THE INVENTION

Figure 1:
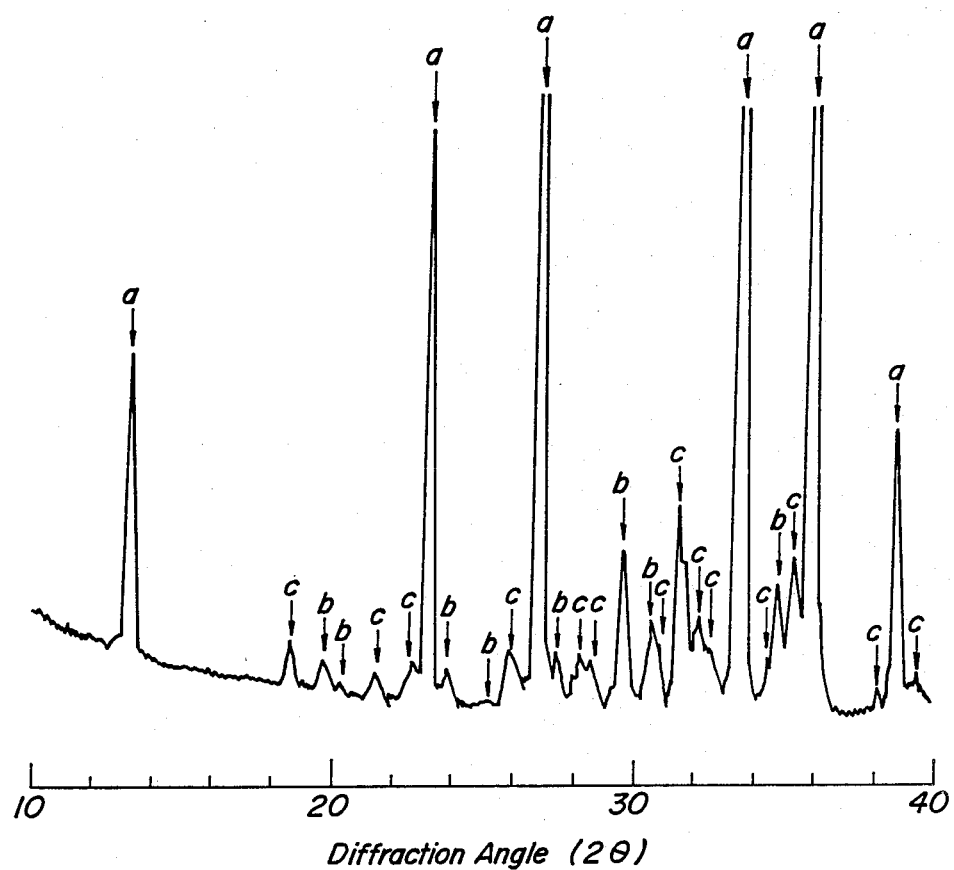
FIG. 1 is a diffraction pattern of the silicon nitride sintered body No. 12 according to the invention by an X-ray diffraction analysis with CuKα radiation.

The silicon nitride sintered body according to the invention will be described in detail below.

The silicon nitride sintered body is densified by reacting the sintering aid with $Si_3N_4$ and $SiO_2$ contained in the silicon nitride material during firing to form a glassy intergranular phase and then performing liquid-phase sintering including a rearrangement step and a dissolution precipitation step independently of pressure sintering and pressureless sintering. In the silicon nitride sintered body having crystallization of the intergranular phase, the glassy intergranular phase is crystallized through a crystallization stage composed of a crystal nucleus formation step and a crystal growth step during the cooling after the densification. In this case, the compounds of Cr, Mn, Co, Ni, Nb and Mo dissolve in the glassy intergranular phase or exist in the vicinity thereof to control or promote the crystal nucleus formation and crystal growth steps, which control the process of crystallizing the glassy intergranular phase. Particularly, even when the cooling rate is slow, the above compounds crystallize the whole intergranular phase in the silicon nitride sintered body into fine crystal grains. Preferably, at least one compound of Cr, Mn, Co, Ni, Nb and Mo as a crystallization controlling agent is used in an amount of 0.05-3% by weight in total as converted into $Cr_2O_3$, MnO, CoO, NiO, $Nb_2O_5$ and $MoO_3$. Even when the amount as $Cr_2O_3$, MnO, CoO, NiO, $Nb_2O_5$ and $MoO_3$ is less than 0.05% by weight, it can not be said that the compounds of Cr, Mn, Co, Ni, Nb and Mo do not act as a crystallization controlling agent, but it is difficult to uniformly blend and disperse them into the silicon nitride material in view of experiment or production, while when it exceeds 3% by weight, it is substantially difficult to crystallize the glassy intergranular phase and hence the glassy phase remains to degrade the high-temperature properties of the silicon nitride sintered body.

The sintering aid in the silicon nitride sintered body according to the invention means a substance that reacts with $Si_3N_4$ and $SiO_2$ in the silicon nitride starting material during the firing to form an oxynitride glass in an intergranular phase, which is crystallized during the subsequent cooling stage, a typical example of which includes preferably at least one compound of Mg, Sr, Sc, Y, Zr, lanthanide elements and Al. The compounds of Cr, Mn, Co, Ni, Nb and Mo act to control the crystallization of oxynitride glass. Preferably, the compounds of Y and Mg, or compounds of Y, Mg and Ce are used as a sintering aid. In case of using Y- and Mg-compounds, the densification is difficult in the pressureless sintering, so that pressure sintering is employed. The Y- and Mg-compounds react with $Si_3N_4$ and $SiO_2$ in the silicon nitride starting material during firing to form an oxide, oxynitride or nitride, which produces glassy phases composed mainly of Y, Mg, Si, O and N in the intergranular phase. Such glassy intergranular phases are crystallized at the cooling stage. In this case, the compounds of Cr, Mn, Co, Ni, Nb and Mo control the crystallization. On the other hand, if the compounds of Y, Mg and Ce are used as the sintering aid, they react with $Si_3N_4$ and $SiO_2$ in the silicon nitride starting material to form an oxide, oxynitride or nitride, which produces glassy phases composed mainly of Y, Mg, Ce, Si, O and N in the intergranular phase. This glassy intergranular phase is easily densified in a nitrogen atmosphere at atmosphere pressure through liquid-phase sintering including a rearrangement step and a dissolution precipitation step. This glassy intergranular phase is substantially crystallized at the cooling stage. In this case, the compounds of Cr, Mn, Co, Ni, Nb and Mo control the crystallization. Further, it is preferable that the amount of $Si_3N_4$ is 75-95% by weight, the amount of Y as $Y_2O_3$ is 2-15% by weight, the amount of Mg as MgO is 1-10% by weight, the amount of Ce as $CeO_2$ is 1-10% by weight, and the total amount of Cr, Mn, Co, Ni, Nb and Mo as $Cr_2O_3$, MnO, CoO, NiO, $Nb_2O_5$ and $MoO_3$ is 0.05-3% by weight. When the $Si_3N_4$ amount exceeds 95% by weight, the amount of the sintering aid is lacking and the densification is insufficient, while when it is less than 75% by weight, the mechanical properties, particularly heat resistance inherent to $Si_3N_4$ are not sufficiently developed. On the other hand, when the amounts of Y, Mg and Ce as a sintering aid are partly or all outside the ranges of 2-15% by weight as $Y_2O_3$, 1-10% by weight as MgO and 1-10% by weigth as $CeO_2$, a sufficient effect as the sintering aid is not obtained during the firing for the densification or the crystallization is insufficient at the cooling stage, and consequently the glassy phase largely remains in the intergranular phase. Even if the amount of at least one compound of Cr, Mn, Co, Ni, Nb and Mo as a crystallization controlling agent is less than 0.05% by weight in total as $Cr_2O_3$, MnO. CoO, NiO, $Nb_2O_5$ and $MoO_3$, it can not be said that they do not act as the crystallization controlling agent, but the uniform blending and dispersing are difficult in view of experiment and actual production, while when it exceeds 3% by weight in total, a large amount of the glassy phase remains in the intergranular phase at the cooling stage, and consequently the mechanical strength and high-temperature properties are degraded.

In FIG. 1 is shown an example of a diffraction pattern in the silicon nitride sintered body containing the compounds of Y, Mg and Ce and the crystallization controlling agent by an X-ray diffraction analysis with CuKα radiation.

The silicon nitride sintered body according to the invention mainly exhibits diffraction lines assigned to $\beta$-$Si_3N_4$ as indicated by "a" in FIG. 1 as well as diffraction lines assigned to crystalline intergranular phases as indicated by "b" and "c" in FIG. 1. Among them, the diffraction line indicated by "c" in FIG. 1 corresponds to that of $Si_3N_4 \cdot 10Y_2O_3 \cdot 9SiO_2$ shown in JCPDS Card 30-1462. Besides, there may be observed another diffraction line assigned to $\alpha$-$Si_3N_4$. Similarly, an embodiment of the microstructure of the silicon nitride sintered body containing the compounds of Y, Mg and Ce and the crystallization controlling agent by means of an electron microscope is shown in FIG. 2. The grains denoted as "$Si_3N_4$" in FIG. 2 are $Si_3N_4$ crystal grains, while the other part or intergranular phase as denoted by "X" in FIG. 2 is occupied by crystal grains causing electron diffraction and contains substantially no glassy phase. Furthermore, as a result of elemental analysis by an energy dispersion-type X-ray elemental analyser under an electron microscope, it has been confirmed that the crystallized intergranular phase contains mainly Y, Mg, Ce and Si as a cation, and in case of including a great amount of at least one of Nb, Ni and Co, grains containing a large amount of Nb, Ni or Co is existent in the microstructure in addition to the crystallized intergranular phase. Moreover, it has been found from an electron energy loss spectroscopy that O and N as an anion are included in the crystallized intergranular phase.

In the silicon nitride sintered body according to the invention containing Y, Mg and Ce as a sintering aid, the intergranular phase is composed of a crystalline phase containing substantially no glassy phase in the microstructure observed by an electron microscope, and indicates a clear diffraction line by an X-ray diffraction analysis. Such a crystallized intergranular phase may be a single crystalline phase or a combination of two or more crystalline phases. In such a silicon nitride sintered body having a substantially crystallized intergranular phase according to the invention, at least one compound of Cr, Mn, Co, Ni, Nb and Mo used as a crystallization controlling agent dissolves into oxynitride glassy phase produced in the intergranular phase through the densification during the firing, or exists in the vicinity of the glassy intergranular phase to crystallize the glassy phase into fine crystal grains even at a slow cooling rate during the cooling. Therefore, the glassy intergranular phase is uniformly crystallized into fine crystal grains in that portion of a furnace which is slow in the cooling rate or a central portion of a product even when performing a mass-firing or shaping of large size products, whereby high strength products are obtained.

The method of producing the silicon nitride sintered body according to the invention is a method of the production of sintered bodies having particular microstructure and properties within the above mentioned composition range of the invention. Now, this method will be described in detail below.

In blending silicon nitride starting powder with a sintering aid and a crystallization controlling agent selected from compounds of Cr, Mn, Co, Ni, Nb and Mo, at least one compound of Mg, Sr, Sc, Y, Zr, lanthanide element and Al, preferably compounds of Y and Mg is used as the sintering aid. Among these sintering aids, it is preferable that the compound of Y is 2-15% by weight as $Y_2O_3$, the compound of Mg is 1-10% by weight as MgO, and the compund of Ce is 1-10% by weight as $CeO_2$. In the silicon nitride starting powder, the sintering aid and the compounds of Cr, Mn, Co, Ni, Nb and Mo as the crystallization controlling agent, the kind and amount of impurities are different in accordance with their production methods. In general, the impurities remain in the intergranular phase of the silicon nitride sintered body as a glassy phase, resulting in the reduction of mechanical strength, oxidation resistance and fatigue properties at high temperatures. Therefore, it is favorable that each of the starting materials has a purity of not less than 96% by weight and particularly, cationic impurities contained therein is not more than 1% by weight. The sintering aid or the compounds of Cr, Mn, Co, Ni, Nb and Mo as the crystallization controlling agent form oxide, oxynitride or nitride in the sintered body, so that they may be added as each component of the sintering aid, salts or alkoxides of Cr, Mn, Co, Ni and Mo and the like or in the form of solution, which can thereafter be converted into oxides and so on. In this case, however, these compounds are subjected to a heat treatment in an oxidizing atmosphere, so that $Si_3N_4$ starting powder is oxidized or decomposition gases hindering the densification are generated. Therefore, it is rather favorable to use oxide powders such as $Y_2O_3$, MgO, $CeO_2$, $Cr_2O_3$, MnO, CoO, NiO, $Nb_2O_5$, $MoO_3$ and so on.

The grinding and blending of the starting material powders are carried out by either wet process with water or organic solvent or dry process, using an oscillation mill, rotary mill, attrition mill or the like. In this case, it is desirable to use steel balls each coated with nylon resin, silicon nitride porcelain balls, or balls of the compound used as the sintering aid in order to prevent the incorporation of impurities due to the erosion of the balls used in the grindig and blending. The grinding time is dependent upon the grinding system and the amount of powders treated, but it is preferable to continue the grinding until constant saturated values of average particle size and BET specific surface are of the resulting blend powder have been attained. The blend powder obtained by grinding and mixing through wet process is dried and molded into a desired shape by an ordinary dry press molding, an extrusion molding, slip cast molding, a combination of injection molding with hydrostatic pressing, or the like. Then, the resulting molded body is densified by a pressure sintering or a pressureless sintering and cooled to obtain a silicon nitride sintered body. In this case, the firing may be performed at a high temperature up to 2000° C. for densification while controlling vaporization of $Si_3N_4$ under a pressurized atmosphere. When the sintering aid is the compounds of Y, Mg and Ce, it is desirable to perform the pressureless sintering in a nitrogen gas or inert gas atmosphere at 1650°-1800° C. for a sufficient time. In this case, however, a dense sintered body may not be obtained in the inert gas atmosphere because $Si_3N_4$ is apt to decompose and sublimate in this atmosphere, so that the use of the nitrogen gas atmosphere is preferable.

In the latter case, the densification is sufficiently attained by firing at 1650°-1800° C. in a pressureless nitrogen atmosphere, so that the pressure sintering or the sintering under pressurized nitrogen atmosphere is not necessarily required. When the sintering aid is the compounds of Y, Mg and Ce, if the firing temperature is less than 1650° C. in the pressureless nitrogen atmosphere, the firing is insufficient for the densification, while if it exceeds 1800° C., the decomposition and vaporization of $Si_3N_4$ become violent and a dense sintered body can not be obtained. Further, in the production of the silicon nitride sintered body according to the invention, the intergranular phase is substantially changed into the crystalline phase at the cooling stage. Since the crystallization controlling agent selected from the compounds of Cr, Mn, Co, Ni, Nb and Mo mainly controls the crystallization of the intergranular phase at a slow cooling rate, if the cooling rate is fast at a temperature crystallizing the intergranular phase, the crystallization may be insufficient. When the crystallization is insufficient due to the rapid cooling after the firing, the intergranular phase may substantially be changed into the crystalline phase by reheating at crystallization temperature. When the sintering aid is the compounds of Y and Mg or the compounds of Y, Mg and Ce, the cooling rate is preferable to be not faster than 10° C./min for the sufficient crystallization of the intergranular phase during the cooling from 1500° C. causing the crystallization to 1000° C.

As mentioned above, the method of producing the silicon nitride sintered body according to the invention comprises steps of blending silicon nitride starting powder with the sintering aid and at least one compound of Cr, Mn, Co, Ni, Nb and Mo at a predetermined blending ratio, molding and firing the resulting blend, so that the resulting silicon nitride sintered bodies have high mechanical strength and excellent oxidation resistance and fatigue properties because the intergranular phase is substantially changed into the crystalline phase composed of fine crystal grains even at a slow cooling rate.

The following examples are given in illustration of the invention and are not intended as limitations thereof.

EXAMPLE 1

A silicon nitride starting powder having a purity of 97.1%, an average particle size of 0.7 μm and a BET specific surface area of 20 $m^2/g$ was blended with $Y_2O_3$ and MgO powders having a purity of 98–99%, an average particle size of 0.6–1 μm and a BET specific surface area of 8–20 $m^2/g$ and $Cr_2O_3$, MnO, CoO, NiO, $Nb_2O_5$ or $MoO_3$ having a purity of 98–99.9%, an average particle size of 0.5–3 μm and a BET specific surface area of 5–10 $m^2/g$ at a blending ratio as shown in the following Table 1, which was placed in a nylon resin container of 1.2 l capacity together with 1.2 kg per 200 g of the blend of silicon nitride porcelain balls and 500 ml of water and then ground by means of an oscillation mill at a vibration number of 1200 cycles/min for 10 hours. Thereafter, water was vaporized, and the ground blend was granulated into a grain size of 100 μm as a powder for pressure sintering. Then, the powders were sintered in a carbon mold at a temperature of 1700° C. under a pressure of 300 kg/$cm^2$ for 1 hour in the form of a disc product having a diameter of 50 mm and a thickness of 5 mm or a cylindrical product having a diameter of 50 mm and a height of 50 mm, and the temperature in furnace was lowered from 1500° C. to 1000° C. at a rate of 10° C./min to obtain silicon nitride sintered body Nos. 1–6 according to the invention. On the other hand, silicon nitride sintered bodies containing no compound of Cr, Mn, Co, Ni, Nb and Mo as a crystallization controlling agent and having a composition outside the ranges according to the invention were produced under the same conditions as described above to produce comparative sintered body Nos. 7, 8. As a result of chemical analysis on the silicon nitride sintered body Nos. 1–8, the composition of Y, Mg, Cr, Co, Ni, Nb and Mo in these sintered bodies was substantially coincident with the corresponding blend composition. The bulk density, state of intergranular phase and four point bending strengths at room temperature and 1000° C. of the disc products and cylindrical products are shown in Table 1.

TABLE 1

| | | Blend composition (wt %) | | | | | Disc product of 50 mm diameter × 5 mm thickness | | | |
|---|---|---|---|---|---|---|---|---|---|---|
| | | | | | | | Bulk density (g/$cm^3$) | State of intergranular phase | | Four point bending strength (MPa) |
| | No. | $Si_3N_4$ | $Y_2O_3$ | MgO | $Cr_2O_3$, MnO, CoO, NiO, $Nb_2O_5$ $MoO_3$ | | | Crystallization | Coarsening of crystal grains | Room temperature | 1000° C. |
| Invention Example | 1 | 89 | 8 | 2 | $Cr_2O_3$ | 1 | 3.4 | crystallized, no glassy phase | none | 730 | 700 |
| | 2 | 89 | 8 | 2 | MnO | 1 | 3.4 | crystallized, no glassy phase | none | 689 | 690 |
| | 3 | 89 | 8 | 2 | CoO | 1 | 3.4 | crystallized, no glassy phase | none | 700 | 670 |
| | 4 | 89 | 6 | 4 | NiO | 1 | 3.3 | crystallized, no glassy phase | none | 690 | 680 |
| | 5 | 89 | 6 | 4 | $Nb_2O_5$ | 1 | 3.3 | crystallized, no glassy phase | none | 700 | 710 |
| | 6 | 89 | 6 | 4 | $MoO_3$ | 1 | 3.4 | crystallized, | none | 710 | 710 |

TABLE 1-continued

| | No. | | | | | Bulk density (g/cm³) | Crystallization | Coarsening of crystal grains | Four point bending strength (MPa) Room temperature | 1000° C. |
|---|---|---|---|---|---|---|---|---|---|---|
| Comparative Example | 7 | 90 | 8 | 2 | — | 3.3 | no glassy phase crystallized, no glassy phase | none | 710 | 700 |
| | 8 | 90 | 6 | 4 | — | 3.3 | crystallized, no glassy phase | none | 690 | 680 |

| | | | Cylindrical product of 50 mm diameter × 50 mm height | | | |
|---|---|---|---|---|---|---|
| | | | | State of intergranular phase | | Four point bending strength (MPa) |
| | | No. | Bulk density (g/cm³) | Crystallization | Coarsening of crystal grains | Room temperature / 1000° C. |
| Invention Example | | 1 | 3.4 | crystallized, no glassy phase | none | 720 / 710 |
| | | 2 | 3.3 | crystallized, no glassy phase | none | 690 / 700 |
| | | 3 | 3.4 | crystallized, no glassy phase | none | 690 / 710 |
| | | 4 | 3.3 | crystallized, no glassy phase | none | 710 / 690 |
| | | 5 | 3.3 | crystallized, no glassy phase | none | 680 / 670 |
| | | 6 | 3.4 | crystallized, no glassy phase | none | 690 / 720 |
| Comparative Example | | 7 | 3.3 | crystallized, no glassy phase | cracking due to coarsening | 420 / 400 |
| | | 8 | 3.2 | crystallized, no glassy phase | cracking due to coarsening | 390 / 400 |

The bulk density of the sintered body was measured by Archimedes' method. The four point bending strength was measured in accordance with "Testing Method for Flexural Strength of Fine Ceramics" prescribed in JIS R-1601. The specimen for the measurement of four point bending strength and static fatigue properties was cut out from the disc or cylindrical product into a given shape. Further, the crystalline phase in the intergranular phase state was evaluated from the results of X-ray diffraction analysis with CuKα radiation and electron microscope observation, from which it has been confirmed that the crystalline phase exhibits diffraction lines other than $Si_3N_4$ through X-ray diffraction analysis and contains crystals other than $Si_3N_4$ in the microstructure.

The presence of glassy phase was based on the fact that the portion causing no electron diffraction in the microstructure is the glassy phase. The coarsening of crystal grain shows that the crystals of the intergranular phase locally grow up to about 100 μm, as shown in FIG. 3, by observation of an optical microscope. In the case of such a coarsening, cracks were always produced in the sintered body to decrease the strength.

When the silicon nitride sintered body is produced by using $Y_2O_3$ and MgO as a sintering aid through the pressure sintering, if the resulting product is a disc product having a diameter of 50 mm and a thickness of 5 mm, it is small in the heat capacity and can be sufficiently cooled at a fast cooling rate, so that in all of the product Nos. 1–8 according to the invention and comparative examples, the intergranular phase is crystallized into fine crystal grains to provide high strength. While, if the product is a cylindrical product having a diameter of 50 mm and a height of 50 mm, the heat capacity is large and the cooling rate is slow in the inside of the product, so that in the product Nos. 7, 8 of the comparative examples containing no crystallization controlling agent, the crystal grains in the intergranular phase are coarsened to produce cracks and reduce the strength to not more than 420 MPa. On the other hand, even in the cylindrical product Nos. 1–6 according to the invention, the intergranular phase is crystallized into fine crystal grains up to the inside of the product by the action of $Cr_2O_3$, MnO, CoO, NiO, $Nb_2O_5$ or $MoO_3$ as a crystallization controlling agent to provide a strength of not less than 670 MPa equal to that of the disc product.

EXAMPLE 2

A silicon nitride starting powder having a purity of 97.1%, an average particle size of 0.7 μm and a BET specific surface area of 20 m²/g was blended with $Y_2O_3$, MgO and $CeO_2$ powders having a purity of 98-99%, an average particle size of 0.6-2 μm and a BET specific surface area of 8-30 m²/g and $Cr_2O_3$, MnO, CoO, NiO, $Nb_2O_5$ or $MoO_3$ having a purity of 98-99.9%, an average particle size of 0.5-3 μm and a BET specific surface area of 5-10 m²/g at a blending ratio as shown in the following Table 2, which were ground and blended by the same method as in Example 1 to obtain powder for molding. Then, the powders were molded under a static pressure of 3 ton/cm² into a square product of 60×60×6 mm or a cylindrical product of 80 mm diameter×80 mm height, which was sintered in a pressureless nitrogen atmosphere at a firing temperature shown in Table 1 for 30 minutes and then the furnace temperature was lowered from 1500° C. to 1000° C. at a cooling rate of 10° C./min to obtain sintered body Nos. 9-24 according to the invention. Separately, silicon nitride sintered body Nos. 25-41 having a composition outside the range of the invention were produced as comparative examples under the same conditions as described above. As a result of chemical analysis on these sintered bodies, the composition of Y, Mg, Ce, Nb, Ni and Co in the silicon nitride sintered body Nos. 9-41 was substantially coincident with the corresponding blend composition. In these square products, the bulk density, state of intergranular phase and four point bending strengths at room temperature and 1000° C. are shown in Tables 2 and 3. Furthermore, the bulk density, state of intergranular phase and four point bending strengths at room temperature and 1000° C. in the cylindrical products of the silicon nitride sintered body Nos. 9-24 according to the invention and comparative example Nos. 25-34 are also shown in Tables 2 and 3. Moreover, stress causing no rupture at 1000° C. under a static load for 100 hours and the deformation amount accompanied therewith are shown in Table 2 as fatigue properties in the cylindrical products of the silicon nitride sintered body Nos. 9-24 according to the invention causing no coarsening of crystal in intergranular phase nor crack.

TABLE 2

| | | Blend composition (wt %) | | | | | Firing temperature (°C.) | Square product of 60 × 60 × 6 mm | | |
|---|---|---|---|---|---|---|---|---|---|---|
| | | | | | | | | Bulk density (g/cm³) | State of intergranular phase | |
| | No. | $Si_3N_4$ | $Y_2O_3$ | MgO | $CeO_2$ | $Cr_2O_3$, MnO, CoO, NiO, $Nb_2O_5$, $MoO_3$ | | | Crystalline phase | Coarsening of crystal grains |
| Invention Example | 9 | 93.9 | 2 | 3 | 1 | $Nb_2O_5$ 0.1 | 1800 | 3.2 | b, c | none |
| | 10 | 93.9 | 2 | 3 | 1 | $Cr_2O_3$ 0.1 | 1800 | 3.2 | b, c | none |
| | 11 | 81.9 | 3 | 10 | 5 | NiO 0.1 | 1700 | 3.2 | b, c | none |
| | 12 | 81.9 | 3 | 10 | 5 | MnO 0.1 | 1700 | 3.2 | b, c | none |
| | 13 | 89.9 | 4 | 1 | 5 | CoO 0.1 | 1700 | 3.2 | b, c | none |
| | 14 | 89.9 | 4 | 1 | 5 | $MoO_3$ 0.1 | 1700 | 3.2 | b, c | none |
| | 15 | 81 | 4 | 2 | 10 | $Nb_2O_5$ 3 | 1750 | 3.4 | grains containing greater amounts of b, c and Nb | none |
| | 16 | 81 | 4 | 2 | 10 | $Cr_2O_3$ 3 | 1750 | 3.4 | grains containing greater amounts of b, c and Cr | none |
| | 17 | 85 | 6 | 4 | 2 | NiO 3 | 1750 | 3.4 | grains containing greater amounts of b, c and Ni | none |
| | 18 | 85 | 6 | 4 | 2 | MnO 3 | 1750 | 3.4 | grains containing greater amounts of b, c and Mn | none |
| | 19 | 86 | 8 | 2 | 1 | CoO 3 | 1750 | 3.3 | grains containing greater amounts of b, c and Co | none |
| | 20 | 86 | 8 | 2 | 1 | $MoO_3$ 3 | 1750 | 3.4 | grains containing greater amounts of b, c and Mo | none |
| | 21 | 80 | 8 | 4 | 5 | $Nb_2O_5$ 2, NiO 1 | 1700 | 3.4 | b, c | none |
| | 22 | 79 | 8 | 9 | 1 | $Cr_2O_3$ 2, MnO 1 | 1700 | 3.4 | b, c | none |
| | 23 | 82.95 | 10 | 2 | 5 | $Nb_2O_5$ 0.05 | 1800 | 3.2 | c | none |
| | 24 | 75.95 | 15 | 4 | 5 | NiO 0.05 | 1650 | 3.2 | b, c | none |

| | | Square product of 60 × 60 × 6 mm | | Cylindrical product of 80 mm diameter × 80 mm height | | | | | | |
|---|---|---|---|---|---|---|---|---|---|---|
| | | Four point bending strength (MPa) | | Bulk density (g/cm²) | State of intergranular phase | | Four point bending strength (MPa) | | Static fatigue properties 1000° C., 100 hours | |
| | No. | Room temperature | 1000° C. | | Crystalline phase | Coarsening of crystal grains | Room temperature | 1000° C. | Stress causing no rupture (MPa) | Deformation amount (%) |
| Invention Example | 9 | 680 | 680 | 3.2 | b, c | none | 690 | 680 | 650 | <0.1 |
| | 10 | 670 | 680 | 3.2 | b, c | none | 680 | 670 | 650 | <0.1 |
| | 11 | 730 | 660 | 3.2 | b, c | none | 720 | 700 | 650 | <0.1 |
| | 12 | 700 | 690 | 3.2 | b, c | none | 700 | 710 | 625 | <0.1 |
| | 13 | 720 | 680 | 3.2 | b, c | none | 730 | 700 | 650 | <0.1 |
| | 14 | 690 | 680 | 3.2 | b, c | none | 710 | 720 | 650 | <0.1 |
| | 15 | 750 | 700 | 3.4 | grains containing greater amounts of b, c and Nb | none | 770 | 700 | 675 | <0.1 |

TABLE 2-continued

| | | | | | | | | | |
|---|---|---|---|---|---|---|---|---|---|
| 16 | 740 | 690 | 3.4 | grains containing greater amounts of b, c and Cr | none | 720 | 710 | 650 | <0.1 |
| 17 | 690 | 700 | 3.4 | grains containing greater amounts of b, c and Ni | none | 700 | 690 | 625 | <0.1 |
| 18 | 700 | 710 | 3.4 | grains containing greater amounts of b, c and Mn | none | 670 | 680 | 650 | <0.1 |
| 19 | 650 | 680 | 3.3 | grains containing greater amounts of c and Co | none | 670 | 700 | 600 | <0.1 |
| 20 | 720 | 700 | 3.4 | grains containing greater amounts of c and Mo | none | 680 | 690 | 650 | <0.1 |
| 21 | 780 | 750 | 3.4 | grains containing greater amounts of b, c, Nb and Ni | none | 780 | 770 | 675 | <0.1 |
| 22 | 740 | 750 | 3.4 | grains containing greater amounts of b, c, Cr and Mo | none | 750 | 750 | 675 | <0.1 |
| 23 | 700 | 700 | 3.2 | c | none | 730 | 750 | 650 | <0.1 |
| 24 | 680 | 650 | 3.2 | b, c | none | 650 | 680 | 625 | <0.1 |

TABLE 3

| | No. | Blend composition (wt %) | | | | | | Firing temperature (°C.) | Square product of 60 × 60 × 6 mm | | | | | Cylindrical product of 80 mm diameter × 80 mm height | | | | |
|---|---|---|---|---|---|---|---|---|---|---|---|---|---|---|---|---|---|---|
| | | | | | | | | | | State of intergranular phase | | | Four point bending strength (MPa) | | State of intergranular phase | | Four point bending strength (MPa) | |
| | | Si₃N₄ | Y₂O₃ | MgO | CeO₂ | Cr₂O₃, MnO, CoO, Nb₂O₅, MoO₃ | | | Bulk density (g/cm³) | Crystalline phase | Coarsening of crystal grains | Room temperature | 1000° C. | Bulk density (g/cm³) | Crystalline phase | Coarsening of crystal grains | Room temperature | 1000° C. |
| Comparative Example | 25 | 94 | 2 | 3 | 1 | — | | 1800 | 3.2 | b, c | none | 690 | 670 | 3.2 | b, c | cracking due to coarsening | 450 | 450 |
| | 26 | 82 | 3 | 10 | 5 | — | | 1700 | 3.2 | b, c | none | 720 | 660 | 3.2 | b, c | cracking due to coarsening | 460 | 480 |
| | 27 | 90 | 4 | 1 | 5 | — | | 1700 | 3.2 | b, c | none | 680 | 640 | 3.2 | b, c | cracking due to coarsening | 500 | 490 |
| | 28 | 84 | 4 | 2 | 10 | — | | 1750 | 3.3 | b, c | none | 700 | 650 | 3.2 | b, c | cracking due to coarsening | 480 | 430 |
| | 29 | 88 | 6 | 4 | 2 | — | | 1750 | 3.2 | b, c | none | 690 | 660 | 3.1 | b, c | cracking due to coarsening | 450 | 450 |
| | 30 | 89 | 8 | 2 | 1 | — | | 1750 | 3.2 | c | none | 670 | 620 | 3.1 | c | cracking due to coarsening | 520 | 480 |
| | 31 | 83 | 8 | 4 | 5 | — | | 1700 | 3.3 | b, c | none | 750 | 690 | 3.2 | b, c | cracking due to coarsening | 490 | 450 |
| | 32 | 82 | 8 | 9 | 1 | — | | 1700 | 3.3 | b, c | none | 740 | 720 | 3.3 | b, c | cracking due to coarsening | 510 | 460 |
| | 33 | 83 | 10 | 2 | 5 | — | | 1800 | 3.2 | c | none | 710 | 660 | 3.2 | c | cracking due to coarsening | 490 | 500 |
| | 34 | 76 | 15 | 4 | 5 | — | | 1650 | 3.2 | b, c | none | 700 | 650 | 3.2 | b, c | cracking due to coarsening | 480 | 520 |
| | 35 | 84 | 6 | 4 | 2 | Cr₂O₃ | 4 | 1750 | 3.2 | b, c, unidentifiable phase, glassy phase remains | none | 680 | 410 | | | | | |
| | 36 | 84 | 6 | 4 | 2 | MnO | 4 | 1750 | 3.4 | b, c, glassy phase remains | none | 700 | 380 | | | | | |
| | 37 | 84 | 6 | 4 | 2 | CoO | 4 | 1750 | 3.4 | b, c, glassy phase remains | none | 640 | 350 | | | | | |
| | 38 | 84 | 6 | 4 | 2 | Cr₂O₃, NiO | 2, 2 | 1750 | 3.4 | b, c, glassy phase remains | none | 710 | 320 | | | | | |
| | 39 | 79 | 10 | 2 | 5 | NiO | 4 | 1800 | 3.4 | b, c, glassy phase remains | none | 720 | 400 | | | | | |
| | 40 | 79 | 10 | 2 | 5 | Nb₂O₅ | 4 | 1800 | 3.4 | b, c, unidentifiable phase, glassy phase remains | none | 700 | 370 | | | | | |
| | 41 | 79 | 10 | 2 | 5 | MoO₃ | 4 | 1800 | 3.4 | b, c, unidentifiable phase, glassy phase remains | none | 720 | 370 | | | | | |

The bulk density of the sintered body and four point bending strength were measured by the same methods as in Example 1. The fatigue properties were evaluated as to whether or not the same specimen as in the measurement of the four point bending strength was ruptured by applying a constant stress at 1000° C. for 100 hours in the same manner as in the above measurement. In this case, the deflection amount of the four point bending test specimen was measured to determine the deformation amount of the tensile surface. When the state of the intergranular phase was examined by the same method as in Example 1, it was confirmed that the crystals denoted as "b" and "c" exhibited diffraction lines indicated by "b" and "c" in FIG. 1 as mentioned later and that the microstructure includes a crystalline phase in addition to $Si_3N_4$. As a result of elemental analysis by an energy diffusion-type X-ray element analyser in the observation of electron microscope, it has been found that the grains containing a large amount of Cr, Mn, Co, Ni, Nb or Mo are particularly included in the microstructure. The presence of glassy phase and the coarsening of crystal grains were evaluated by the same methods as in Example 1.

The diffraction lines by X-ray diffraction analysis with CuKα radiation of the silicon nitride sintered body No. 12 according to the invention are shown in FIG. 1, wherein lines indicated as "a" are of $β-Si_3N_4$ and lines indicated as "b", "c" are of crystallized intergranular phases, and particularly the line "c" is coincident with interplanar spacing of $Si_3N_4.10Y_2O_3.9SiO_2$ shown in JCPSD Card 30-1462. The electron photomicrograph in the microstructure of the silicon nitride sintered body No. 14 according to the invention is shown in FIG. 2, wherein portions indicated by "$Si_3N_4$" are $Si_3N_4$ crystal grains and portions indicated by "X" are crystallized intergranular phases causing electron diffraction, being free from glassy phase. Moreover, the optical photomicrograph of the microstructure in the interior section of the cylindrical product of the silicon nitride sintered body No. 29 as a comparative example is shown in FIG. 3, wherein the crystal grains of the intergranular phase are composed of coarsened portions with a size of more than 100 μm and finely divided portions.

As mentioned above, when the silicon nitride sintered body obtained by pressureless sintering with $Y_2O_3$, MgO and $CeO_2$ as a sintering aid is shaped into a square product of 60×60×6 mm, since the heat capacity is small, it can sufficiently be cooled at a fast cooling rate, so that the product Nos. 9-24 according to the invention and Nos. 25-34 of the comparative examples show high strength because the intergranular phase is crystallized into fine crystal grains, while in the product Nos. 35-41 of the comparative examples, the crystallization is not sufficiently performed at the cooling stage and the glassy phase remains in the intergranular phase because the amounts of $Y_2O_3$, MgO, CoO, NiO, $Nb_2O_5$ and $MoO_3$ added as a crystallization controlling agent are too large. On the other hand, in the cylindrical product of 80 mm diameter×80 mm height, since the heat capacity is large and the cooling rate is slow in its inside, the product Nos. 25-34 of the comparative examples containing no crystallization controlling agent reduced the strength below 520 MPa due to the fact that crystal grains in the intergranular phase are coarsened to produce cracks in the sintered body, while the cylindrical product Nos. 9-24 according to the invention show the strength of not less than 650 MPa, which is equal to that of the square product, because the intergranular phase is crystallized into fine crystal grains up to the inside of the cylindrical product by the effect of $Cr_2O_3$, MnO, CoO, NiO, $Nb_2O_5$ or $MoO_3$ as the crystallization controlling agent.

EXAMPLE 3

The square shaped body having the same blend composition as in the silicon nitride sintered body No. 17 according to the invention in Table 2 and the square shaped body having the same blend composition as in the silicon nitride sintered body No. 29 of the comparative example in Table 3 were produced in the same manner as described in Example 2, and then fired at a firing temperature as shown in the following Table 4 and cooled from 1500° C. to 1000° C. at a cooling rate shown in Table 4 to obtain silicon nitride sintered body Nos. 43-45 according to the invention and Nos. 42 and 46-49 of the comparative examples. The bulk density, state of intergranular phase and four point bending strength were measured with respect to these silicon nitride sintered bodies by the same methods as described in Example 2 to obtain results as shown in Table 4. Furthermore, the stress causing no rupture under a static load at 1000° C. for 100 hours and the deformation amount accompanied therewith were measured as fatigue properties with respect to the silicon nitride sintered body Nos. 43-45 according to the invention and No. 47 of the comparative example each having a high four point bending strength at 1000° C. to obtain results as shown in Table 4.

TABLE 4

| | No. corresponding to blend composition of Table 2 | Firing temperature (°C.) | Cooling rate from 1500° C. to 1000° C. (°C./min) | Bulk density (g/cm³) | State of intergranular phase | | Four point bending strength (MPa) | | Static fatigue properties 1000° C., 100 hours | |
|---|---|---|---|---|---|---|---|---|---|---|
| | | | | | Crystalline phase | Coarsening of crystal grains | Room temperature | 1000° C. | Stress causing no rupture (MPa) | Deformation amount (%) |
| Comparative Example | 42 | 17 | 1750 | 50 | 3.4 | grains containing greater amounts of b, c and Ni, glassy phase remains | none | 720 | 410 | | |
| Invention Example | 43 | 17 | 1750 | 10 | 3.4 | grains containing greater amounts of b, c and Ni | none | 690 | 700 | 625 | <0.1 |
| | 44 | 17 | 1750 | 5 | 3.4 | grains containing greater amounts of b, c and Ni | none | 720 | 700 | 650 | <0.1 |
| | 45 | 17 | 1750 | 2 | 3.4 | grains containing | none | 740 | 700 | 650 | <0.1 |

TABLE 4-continued

| | No. corresponding to blend composition of Table 2 | Firing temperature (°C.) | Cooling rate from 1500° C. to 1000° C. (°C./min) | Bulk density (g/cm³) | State of intergranular phase | | Four point bending strength (MPa) | | Static fatigue properties 1000° C., 100 hours | |
|---|---|---|---|---|---|---|---|---|---|---|
| | | | | | Crystalline phase | Coarsening of crystal grains | Room temperature | 1000° C. | Stress causing no rupture (MPa) | Deformation amount (%) |
| Comparative Example 46 | 29 | 1750 | 50 | 3.2 | greater amounts of b, c and Ni b, c, glassy phase remains | none | 730 | 400 | | |
| 47 | 29 | 1750 | 10 | 3.2 | b, c | none | 690 | 660 | 650 | <0.1 |
| 48 | 29 | 1750 | 5 | 3.2 | b, c | cracking due to coarsening | 410 | 420 | | |
| 49 | 29 | 1750 | 2 | 3.2 | b, c | cracking due to coarsening | 440 | 400 | | |

In the pressureless sintered body from the square product of 60×60×6 mm containing $Y_2O_3$, MgO and $CeO_2$ as a sintering aid, when the cooling rate is adequate as shown in the comparative example No. 47, the intergranular phase is crystallized into fine crystal grains, while when it is slow as shown in the comparative example Nos. 48, 49, the crystal grains of the intergranular phase are coarsened to produce cracks in when the sintered body and hence the strength is reduced to below 440 MPa. While, the cooling rate is fast as shown in the comparative example Nos. 42, 46, the intergranular phase is not sufficiently crystallized and the glassy phase remains therein to reduce the strength at 1000° C. On the contrary, when the crystallization controlling agent is included as in the sintered body Nos. 44, 45 according to the invention, even if the cooling rate is slow, the intergranular phase is crystallized into fine crystal grains and the high strength of not less than 690 MPa is obtained.

As apparent from Examples 1, 2 and 3, in the silicon nitride sintered body according to the invention consisting mainly of $Si_3N_4$ and the sintering aid and containing at least one compound of Cr, Mn, Co, Ni, Nb and Mo as a crystallization controlling agent, even if the sintered body is shaped into a large product or the cooling rate is slow, the intergranular phase is crystallized into fine crystal grains without coarsening the crystal grains to result in no reduction of the strength. When the sintering aid is the compounds of Y and Mg or the compounds of Y, Mg and Ce, the bulk density is as high as 3.2 g/cm³ and the intergranular phase is substantially crystallized and the four point bending strengths at room temperature and 1000° C. are as high as not less than 624 MPa. Particularly, when the sintering aid is the compounds of Y, Mg and Ce, the static fatigue properties at 1000° C. are excellent, and the rupture or deformation does not result even under a stress of 625 MPa for more than 100 hours.

As mentioned above, the silicon nitride sintered body according to the invention comprises $Si_3N_4$ and a sintering aid and has a substantially crystallized intergranular phase, so that it is possible to perform mass-firing or shaping into a large size product by including at least one compound of Cr, Mn, Co, Ni, Nb and Mo as a crystallization controlling agent, resulting in the production of the silicon nitride sintered body having improved density, mechanical strength, oxidation resistance and fatigue properties. Since silicon nitride sintered body according to the invention can be subjected to mass-firing or the shaping into large products, the production cost is low and also the production of complicated configurations is possible, so that the sintered body is applicable to mechanical structural components such as engine parts, gas turbine parts and the like. In this case, the uniform silicon nitride sintered body is obtained even in mass-firing or shaping into large products, so that the reliability on the components is largely improved and industrial merits are very large.

What is claimed is:

1. A silicon nitride sintered body consisting essentially of:
    $Si_3N_4$ in an amount of 75–95% by weight;
    at least one crystallization control agent selected from the compounds of the group consisting of Mn, Co, Ni, Nb, and Mo, said crystallization control agent being present in an amount of 0.05–3.0% by weight as MnO, CoO, NiO, $Nb_2O_5$ and $MoO_3$; and
    a remainder being a sintering aid present as 2–15% by weight $Y_2O_3$ 1–10% by weight.
    wherein said crystallization control agent results in a substantially crystallized intergranular phase in said silicon nitride body, such that a bending strength of said body at about 1000° C. is substantially the same as a bending strength of said body at room temperature.

2. A silicon nitride sintered body according to claim 1, wherein said silicon nitride is primarily $\beta$-$Si_3N_4$.

3. A silicon nitride sintered body consisting essentially of:
    $Si_3N_4$ in an amount of 75–95% by weight;
    at least one crystallization control agent selected from the compounds of the group consisting of Mn, Co, Ni, Nb, and Mo, said crystallization control agent being present in an amount of 0.05–3.0% by weight as MnO, CoO, NiO, $Nb_2O_5$, and $MoO_3$; and
    a remainder being a sintering aid present as 2–15% by weight $Y_2O_3$, MgO, and $CeO_2$;
    wherein said crystallization control agent results in a substantially crystallized intergranular phase in said silicon nitride body, such that a bending strength of said body at about 1000° C. is substantially the same as a bending strength of said body at room temperature.

4. A silicon nitride sintered body according to claim 3, wherein said silicon nitride is primarily $\beta$-$Si_3N_4$.

5. A method of producing a silicon nitride sintered body comprising:

molding a blended powder of $Si_3N_4$ which is present in an amount of 75–95% by weight, with at least one crystallization control agent selected from compounds of the group consisting of Mn, Co, Ni, Nb, and Mo, said crystallization control agent being present in an amount of 0.05–3.0% by weight as MnO, CoO, NiO, $Nb_2O_5$, and $MoO_3$, with a remainder being a sintering aid present as 2–15% by weight $Y_2O_3$ and 1–10% by weight MgO;

heating said molded powder by a process selected from the group consisting of atmospheric pressure heating and pressurized heating; and cooling said heated body at a cooling rate of not greater than 10° C./min from 1500° C.–1000° C.;

wherein said crystallization control agent results in a substantially crystallized intergranular phase in said silicon nitride sintered body, such that a bending strength of said body at about 1000° C. is substantially the same as a bending strength of said body at room temperature.

6. A method of producing a silicon nitride sintered body according to claim 5, wherein said heating is performed in an atmosphere selected from the group consisting of nitrogen and inert gases.

7. A method of producing a silicon nitride sintered body according to claim 5, wherein said heating is performed at a temperature of about 1650°–1800° C.

8. A method of producing a silicon nitride sintered body comprising:

molding a blended powder of $Si_3N_4$ which is present in an amount of 75–95% by weight, with at least one crystallization control agent selected from compounds of the group consisting of Mn, Co, Ni, Nb, and Mo, said crystallization control agent being present in an amount of 0.05–3.0% by weight as MnO, CoO, NiO, $Nb_2O_5$, and $MoO_3$, with a remainder being a sintering aid present as 2–15% by weight $Y_2O_3$, 1–10% by weight MgO and 1–10% by weight $CeO_2$;

heating said molded powder by a process selected from the group consisting of atmospheric pressure heating and pressurized heating; and cooling said heated body at a cooling rate of not greater than 10° C./min from 1500° C.–1000° C.;

wherein said crystallization control agent results in a substantially crystallized intergranular phase in said silicon nitride sintered body, such that a bending strength of said body at about 1000° C. is substantially the same as a bending strength of said body at room temperature.

9. A method of producing a silicon nitride sintered body according to claim 8, wherein said heating is performed in an atmosphere selected from the group consisting of nitrogen and inert gases.

10. A method of producing a silicon nitride sintered body according to claim 8, wherein said heating is performed at a temperature of about 1650°–1800° C.

11. A method of producing a silicon nitride sintered body comprising:

molding a blended powder of $Si_3N_4$ which is present in an amount of 75–95% by weight, with at least one crystallization control agent selected from compounds of the group consisting of Mn, Co, Ni, Nb, and Mo, said crystallization control agent being present in an amount of 0.05–3.0% by weight as MnO, CoO, NiO, $Nb_2O_5$, and $MoO_3$, with a remainder being a sintering aid present as 2–15% by weight $Y_2O_3$, 1–10% by weight MgO and 1–10% by weight $CeO_2$;

heating said molded powder at a temperature of about 1650°–1800° C. by a process selected from the group consisting of atmospheric pressure heating and pressurized heating; and cooling said heated body at a cooling rate of not greater than 10° C./min from 1,500° C.–1,000° C.;

wherein said crystallization control agent results in a substantially crystallized intergranular phase in said silicon nitride sintered body, such that a bending strength of said body at about 1000° C. is substantially the same as a bending strength of said body at room temperature.

12. A method of producing a silicon nitride sintered body according to claim 11, wherein said heating is performed in an atmosphere selected from the group consisting of nitrogen and inert gases.

* * * * *